W. P. EMERSON.
Horse-Powers.

No. 138,873.

Patented May 13, 1873.

UNITED STATES PATENT OFFICE.

WASHINGTON P. EMERSON, OF PLEASANTVILLE, KENTUCKY.

IMPROVEMENT IN HORSE-POWERS.

Specification forming part of Letters Patent No. 138,873, dated May 13, 1873; application filed March 22, 1873.

*To all whom it may concern:*

Be it known that I, WASHINGTON P. EMERSON, of Pleasantville, in the county of Henry and State of Kentucky, have invented a new and Improved Horse-Power, of which the following is a specification:

My invention consists of a series of vertical shafts arranged in a circle with pulleys at the lower end, all in the same horizontal plane, in which the driving-belt works, the horse being hitched to a belt working on pulleys, and the upper ends having transmitting-pulleys in different trains, from which the belts work onto a central vertical shaft, which is speeded up and transmits the motion by a belt from a large pulley on it, by which I obtain rapid motion without large wheels or pulleys, which are expensive and cumbersome.

Figure 1:
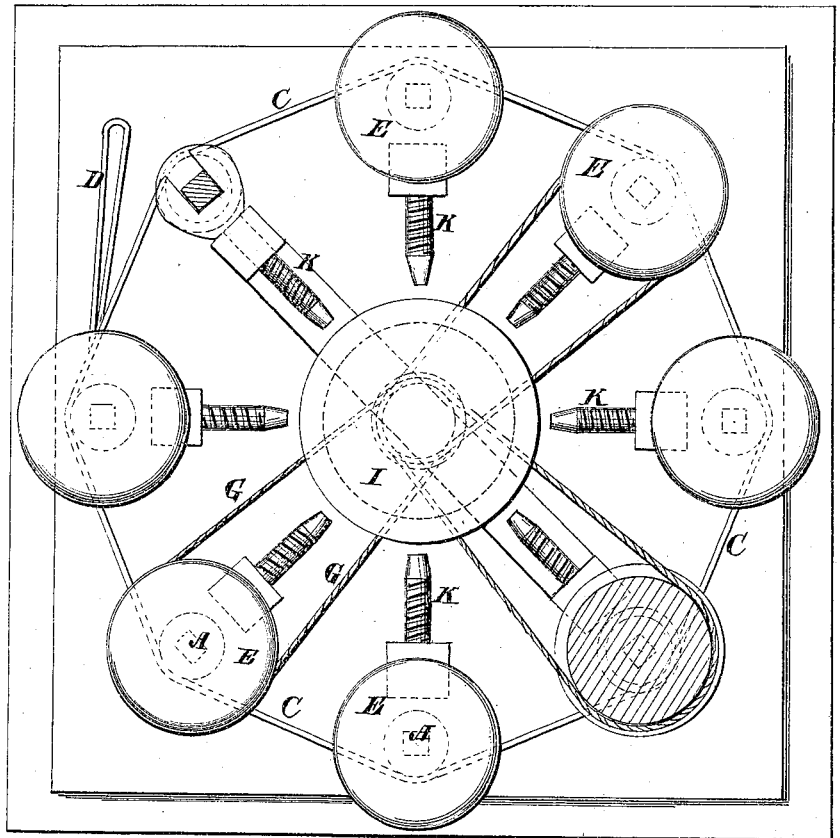
Figure 2:
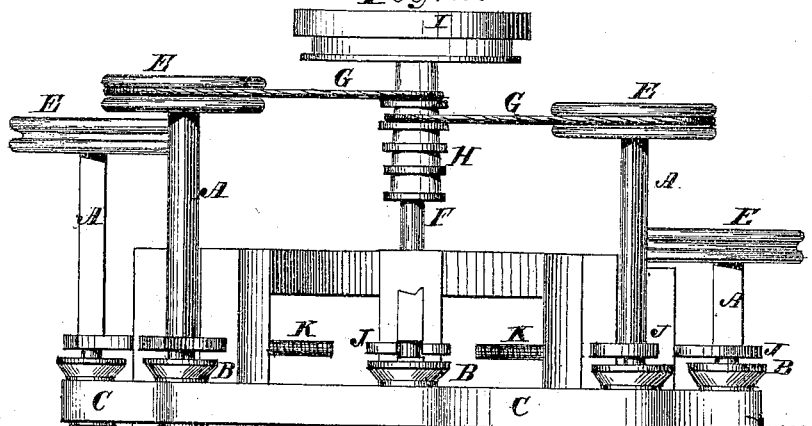

Figure 1 is a plan view of my improved horse-power. Fig. 2 is a side elevation.

Similar letters of reference indicate corresponding parts.

A represents a series of vertical shafts arranged in any suitable frame nearly as large as the circular stack in which the horse travels. At the lower end these shafts have a small pulley, B, whereon the large driving-belt, C, is arranged so as to pass from one to the other around the circle like passing around a large wheel. D is a draft-chain or other device attached to this belt on the outside for hitching the horse to it for turning all the pulleys by pulling the belt around the circle. E represents the pulleys at the upper ends of these shafts in different planes for gearing with a central shaft, F, by belts G, the pulleys E being large and the pulleys H on the shaft F being small to multiply the motion. I represents one or more large transmitting belt-pulleys on the shaft F, with which the machine to be driven will be geared by a belt. These shafts A are mounted on bearings J, which are adjustable radially by screws K to regulate the tension of the driving-belt C. These small pulleys B and the belt C constitute an equivalent for a large driving-belt, but have the effect of giving an initial speed very much greater than a large wheel will; thus the speed can be quickly obtained by small cheap pulleys E, so that a rapid motion of the shaft F is obtained in a simple manner. The parts are light, simple, and cheap.

Having thus described my invention, I claim as new and desire to secure by Letters Patent—

1. The combination of a series of pulleys, B, and a driving-belt, C, in the manner described.

2. The combination of a counter-shaft and pulleys H with the belts G, pulleys E, and the driving-belt C, as described.

3. The pulleys B arranged in radial adjustable bearings, as described.

WASHINGTON P. EMERSON.

Witnesses:
 JOS. F. PRYOR,
 J. N. ROBERTS.